May 16, 1961 C. G. WADELL 2,984,520
TRACTION DEVICE
Filed Sept. 24, 1959 2 Sheets-Sheet 1
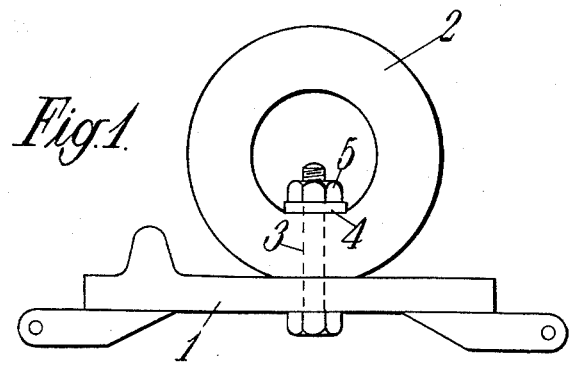
Fig.1
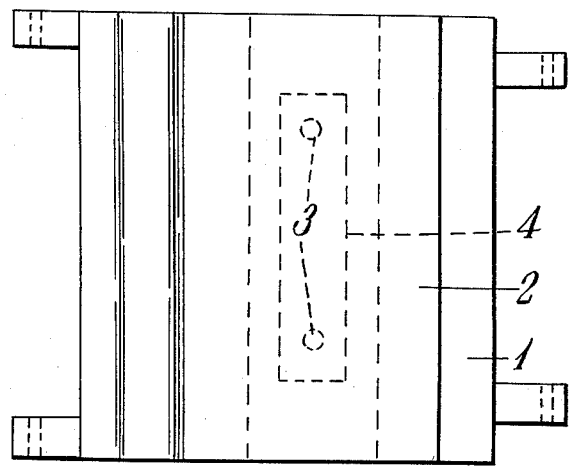
Fig.2
Fig.4
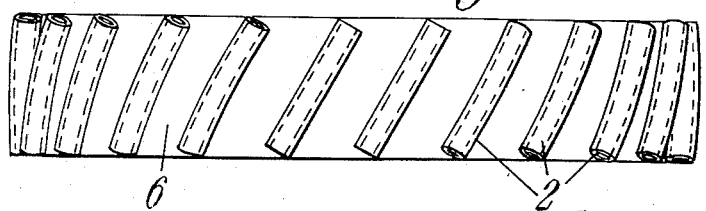
Inventor
C. G. Wadell
By Glascock Downing Siebold
Attys May 16, 1961     C. G. WADELL     2,984,520
TRACTION DEVICE Filed Sept. 24, 1959        2 Sheets-Sheet 2

Inventor
C. G. Wadell
By Clarence A. Downing Tuboll
Attys.

United States Patent Office 2,984,520
Patented May 16, 1961

2,984,520
TRACTION DEVICE
Carl Georg Wadell, Osterportsgatan 3B, Malmo, Sweden
Filed Sept. 24, 1959, Ser. No. 842,063
Claims priority, application Sweden Nov. 5, 1958
3 Claims. (Cl. 301—43)

In order to present sufficient frictional face to the ground on vehicles, particularly tractors with track plates, the plates have often been fitted with crosswise positioned steel ribs.

Similarly the steel wheels of wheel-tractors have been fitted with crosswise or diagonally positioned steel ribs or steel spikes. These ribs or spikes, however, cause considerable damage to the road surface when they are used for running on roads. For this reason, in recent times, the use of such steel wheels on wheel tractors has been discontinued, and instead they have been fitted with pneumatic tyres which, however, are very expensive.

The ribs and spikes also cause considerable vibration and jarring which is very trying for the driver, and causes fatigue phenomenon of the materials from which the tractor is made.

The present invention has for its object to provide means to give the vehicle smooth running free from jarring and vibration, to increase contact surface engaging the ground, and to obviate damage to the road surface.

The means according to this invention is characterized in that the steel tyre rim of the steel wheels or that side of the track plates in contact with the ground are fitted with a series of securely fixed pieces of heavy thick-walled flexible tubing, which pieces are fixed in such a way that their axes are at a right or acute angle to the direction of travel of the wheel or track.

The invention is explained by the accompanying drawings in which:

Fig. 1 shows a side view of a track plate in one form of construction in accordance with the invention.

Fig. 2 shows a plan view of same.

Fig. 4 shows a plan view of same.

*Form of Construction I (Figs. 1 and 2)*

Each plate 1 of a plate track of, for instance, a track laying tractor is fitted, on the face in contact with the ground, with a series of crosswise positioned pieces of heavy flexible tubing 2, preferably rubber tubing, the wall thickness of which is in the main the same as the inside dimension of the tubing. The tubing 2 is suitably fixed to the plate 1 by means of bolts 3 passing through holes in the plate 1 and the tubing 2 and also, fitted inside the tubing 2 through holes in a flat iron piece the length of which finishes some distance from both ends of the tubing 2. This flat iron piece is pressed by means of the nuts 5 screwed on the bolts 3 against the inside of the tubing 2 and secures the tubing 2 to the plate 1. The thickness of the walls of the tubing 2 is such that those pieces of tubing 2 actually in contact with the ground simultaneously are able to support the whole weight of the tractor.

Figure 3:
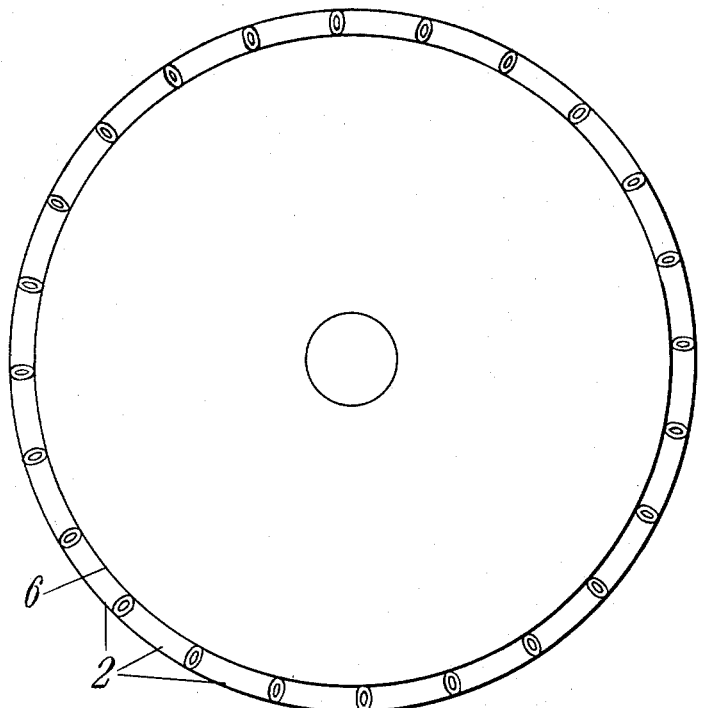
Fig. 3 shows a side view of a steel wheel of a wheel-tractor fitted with one form of construction in accordance with the invention.

*Form of Construction II (Figs. 3 and 4)*

On the outer face of the tyre rim 6 of a steel wheel, say on a wheel-tractor, a series of heavy tubes 2 of the kind mentioned above are secured in the same manner as described above in such a way that together they form a crosswise pattern of tubes of equal thickness at regular-spaced intervals on the outer periphery of the tyre tread 6. It has been proved suitable in obtaining this object to fix the tubes 2 so near together that the remote opposite ends of two adjacent tubes overlap, and if preferred they may be fixed in a zig-zag pattern. The thickness of the walls of the tubes 2 must be sufficient to enable one single tube to support the whole wheel pressure in which case, however, this one tube 2 may be pressed flat.

Figure 5:
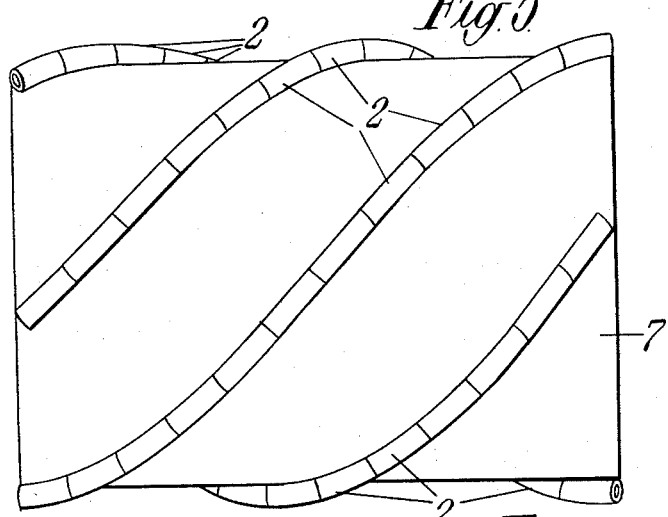
Fig. 5 shows a rolling container fitted with another form of construction in accordance with the invention.

*Form of Construction III (Fig. 5)*

In this form of construction the shell surface 7 of a rolling container intended, say, for the transport of liquids, is fitted with securely fastened narrow pieces of thick tubing 2 of the type mentioned above, which pieces are secured in the same manner as described above, but along helical spirals in spaced relation on the shell surface. The pieces of tubing 2 are fixed so near together that those tubes that are simultaneously in contact with the ground are able to carry the weight of a full container.

Although only three forms of construction have been shown and described above other forms may be constructed within the scope of the invention as set forth in the appended claims.

I claim:

1. A traction device for track surfaces and wheels of vehicles comprising a holed non-yielding track section, a holed hollow generally cylindrical member of thick-walled flexible material adapted to be secured to said track section in angular relation to the direction of travel thereof, a holed flat iron piece to be disposed inside said hollow cylindrical member, said cylindrical member being assembled on said track section with said flat iron piece therein, bolts passing through holes in said track section and through holes in said cylindrical member including holes in said iron piece and nuts applied to the bolts to bear against the iron piece within the hollow cylindrical member.

2. A traction device according to claim 1, wherein the iron piece has a length shorter than the hollow cylindrical member.

3. A traction device for track surfaces and wheels of vehicles comprising a holed non-yielding track surface, a series of holed hollow generally cylindrical members of thick-walled flexible material to be secured to said track surface in a helical spiral pattern, a holed flat iron piece adapted to be disposed inside each hollow cylindrical member, said cylindrical members being assembled in said helical spiral pattern along said surface with said flat iron pieces therewithin, bolts passing through said holes in the track surface and through said holes in the cylindrical members and said holes in the iron pieces and nuts applied to the bolts and bearing against the iron pieces received within the hollow cylindrical members.

References Cited in the file of this patent

UNITED STATES PATENTS

| | | |
|---|---|---|
| 771,672 | Sheldon | Oct. 4, 1904 |
| 781,573 | Todd | Jan. 31, 1905 |
| 1,427,813 | Holt | Sept. 5, 1922 |
| 1,568,090 | Saives | Jan. 5, 1926 |
| 1,934,318 | Metcalf et al. | Nov. 7, 1933 |
| 2,080,675 | Sponseller | May 18, 1937 |